(12) United States Patent
Moscaluk

(10) Patent No.: US 7,855,592 B1
(45) Date of Patent: Dec. 21, 2010

(54) CHARGE PUMP

(75) Inventor: Gary Moscaluk, Colorado Springs, CO (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 11/901,751

(22) Filed: Sep. 19, 2007

Related U.S. Application Data

(60) Provisional application No. 60/847,829, filed on Sep. 28, 2006.

(51) Int. Cl.
  *G05F 1/10* (2006.01)
  *G05F 3/02* (2006.01)

(52) U.S. Cl. .................... 327/537; 327/536; 363/59; 363/60

(58) Field of Classification Search .................. 327/536, 327/537; 363/59, 60
See application file for complete search history.

(56) References Cited

U.S. PATENT DOCUMENTS

| | | | |
|---|---|---|---|
| 4,982,318 A | 1/1991 | Maeba et al. | |
| 5,172,013 A | 12/1992 | Matsumura | |
| 5,262,934 A | 11/1993 | Price | |
| 5,448,198 A | 9/1995 | Toyoshima et al. | |
| 5,608,344 A | 3/1997 | Marlow | |
| 5,874,850 A | 2/1999 | Pulvirenti et al. | |
| 5,943,226 A | 8/1999 | Kim | |
| 5,999,426 A | 12/1999 | Meier et al. | |
| 6,072,357 A | 6/2000 | Jo | |
| 6,107,864 A * | 8/2000 | Fukushima et al. | ......... 327/536 |
| 6,184,741 B1 | 2/2001 | Ghilardelli et al. | |
| 6,198,340 B1 | 3/2001 | Ting et al. | |
| 6,240,025 B1 | 5/2001 | Park | |
| 6,259,310 B1 | 7/2001 | Kawamura | |
| 6,278,315 B1 | 8/2001 | Kim | |
| 6,404,270 B1 | 6/2002 | Meng | |
| 6,418,040 B1 | 7/2002 | Meng | |
| 6,501,325 B1 * | 12/2002 | Meng | .......... 327/536 |
| 6,734,717 B2 * | 5/2004 | Min | ............ 327/536 |

OTHER PUBLICATIONS

USPTO Corrected Notice of Allowance for U.S. Appl. No. 09/764,693 dated Aug. 1, 2002; 6 pages.
USPTO Notice of Allowance for U.S. Appl. No. 09/764,693 dated Jul. 25, 2002; 6 pages.
USPTO Final Rejection for U.S. Appl. No. 09/764,693 dated May 2, 2002; 8 pages.

(Continued)

*Primary Examiner*—Lincoln Donovan
*Assistant Examiner*—John W Poos

(57) ABSTRACT

A charge pump circuit has at least three stages: a pre-stage, a common stage and post stage. Each stage has three devices which are common. An NMOS device, which is called the charge injection device (CID), is controlled by a PMOS device during charge injection and an NMOS device during charge trapping. Also, each of the stages includes comparison stages for the CID in order to minimize the bulk to source voltage (Vbs) or bulk to drain voltage (Vbd). This greatly improves efficiency during the charge injection phase. Furthermore, the post-stage includes a comparison stage for the PMOS device since the threshold voltage increases as you increase the number of stages with the bulk tied to VPWR. The PMOS comparison stage should be inserted at the stage where the PMOS device begins to operate in the sub-threshold region, which is technology and voltage dependent.

17 Claims, 2 Drawing Sheets

OTHER PUBLICATIONS

USPTO Non-Final Rejection for U.S. Appl. No. 09/764,693 dated Dec. 3, 2001; 11 pages.

Tanzawa et al., "A Dynamic Analysis of the Dickson Charge Pump Circuit," IEEE Journal of Solid-State Circuits, vol. 32, No. 8, Aug. 1997, pp. 1231-1240; 10 pages.

John F. Dickson, "On-Chip High-Voltage Generation in MNOS Integrated Circuits Using an Improved Voltage Multiplier Technique," IEEE Journal of Solid-State Circuits, vol. SC-11, No. 3, Jun. 1976, pp. 374-378; 5 pages.

Wu et al., "Low Supply Voltage CMOS Charge Pumps," 1997 Symposium on VLSI Circuits Digest of Technical Papers, pp. 81-82; 2 pages.

Wu et al., "MOS Charge Pumps for Low-Voltage Operation," IEEE Journal of Solid-State Circuits, vol. 33, No. 4, Apr. 1998, pp. 592-597; 6 pages.

Shin et al., "A New Charge Pump Without Degradation in Threshold Voltage Due to Body Effect," IEEE Journal of Solid-State Circuits, vol. 35, No. 8, Aug. 2000, pp. 1227-1230; 4 pages.

Choi et al., "Floating-Well Charge Pump Circuits for Sub-2.0V Single Power Supply Flash Memories," 1997 Symposium on VLSI Circuits Digest of Technical Papers, pp. 61-62; 2 pages.

USPTO Notice of Allowance for U.S. Appl. No. 09/723,494 dated Feb. 4, 2002; 3 pages.

USPTO Non-Final Rejection for U.S. Appl. No. 09/723,494 dated Sep. 21, 2001; 10 pages.

USPTO Notice of Allowance for U.S. Appl. No. 09/828,772 dated Feb. 20, 2002; 3 pages.

USPTO Non-Final Rejection for U.S. Appl. No. 09/828,772 dated Oct. 3, 2001; 5 pages.

\* cited by examiner

CHARGE PUMP

RELATED APPLICATIONS

The present invention claims priority on provisional patent application Ser. No. 60/847,829, filed on Sep. 28, 2006, entitled "High Efficiency, Low Voltage Negative Charge Pump with Bulk Bias Control" and is hereby incorporated by reference.

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Charge pumps are used in electronic circuits to provide voltages other than those provided by the power supply. Commonly charge pumps circuits are used in memory devices. There are two main disadvantages of using conventional charge pump circuit. One is that they have poor efficiency especially at low voltage supplies, which in most cases will not function properly. Another disadvantage is that they require large boosting capacitors due to the poor efficiency, which substantially increases the clock driver current consumption.

Thus there exists a need for a charge pump circuit that has a more efficient charge transfer.

BRIEF SUMMARY OF INVENTION

A charge pump circuit that overcomes these and other problems has at least three stages: a pre-stage, a common stage and post stage. Each stage has three devices which are common. An NMOS device, which is called the charge injection device (CID) is controlled by a PMOS device during charge injection and an NMOS device during charge trapping. Also, each of the stages includes comparison stages for the CID in order to minimize the bulk to source voltage (Vbs) or bulk to drain voltage (Vbd). This greatly improves efficiency during the charge injection phase. Furthermore, the post-stage includes a comparison stage for the PMOS device since the threshold voltage increases as you increase the number of stages with the bulk tied to VPWR. The PMOS comparison stage should be inserted at the stage where the PMOS device begins to operate in the sub-threshold region, which is technology and voltage dependent.

DETAILED DESCRIPTION OF THE INVENTION

The present invention is directed to a high efficiency charge pump having three stages; a pre-stage, a common stage and a post stage. Each stage has three devices which are common. An NMOS device, which is called the charge injection device (CID) is controlled by a PMOS device during charge injection and an NMOS device during charge trapping. Also, each of the stages includes comparison stages for the CID in order to minimize the bulk to source voltage (Vbs) or bulk to drain voltage (Vbd). This greatly improves efficiency during the charge injection phase. Furthermore, the post-stage includes a comparison stage for the PMOS device since the threshold voltage increases as you increase the number of stages with the bulk tied to VPWR. The PMOS comparison stage should be inserted at the stage where the PMOS device begins to operate in the sub-threshold region, which is technology and voltage dependent.

Figure 1:
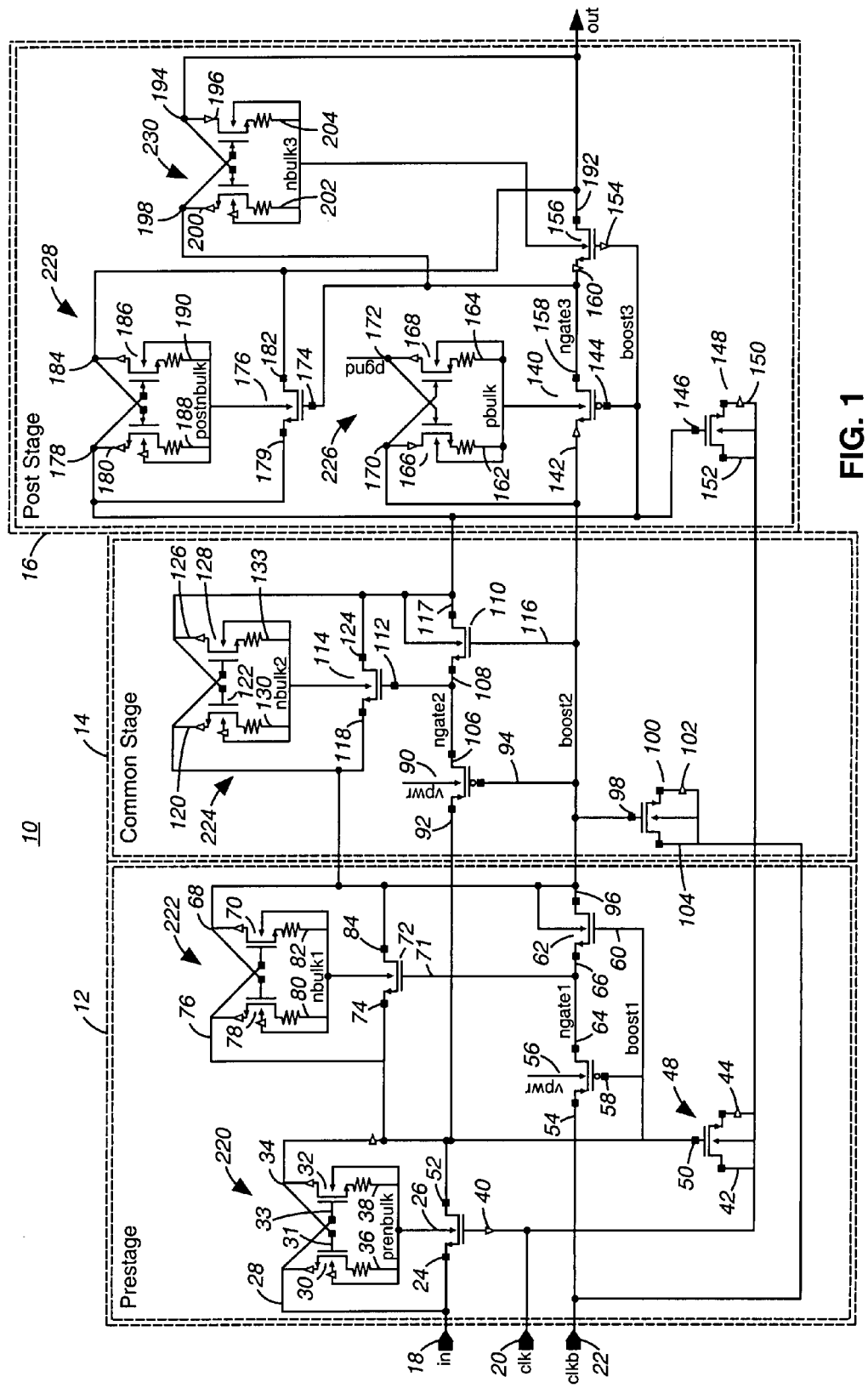
FIG. 1 is a circuit diagram of a high efficiency charge pump in accordance with on embodiment of the invention.

FIG. 1 is a circuit diagram of a high efficiency charge pump 10 in accordance with on embodiment of the invention. The charge pump 10 has three stages; pre-stage 12, common state 14, and post stage 16. There are three inputs to the pre-stage 12: input 18, clock (clk) 20 and clock bar (clkb) 22. The input voltage 18 is coupled to a drain 24 of a NMOS transistor 26. The input voltage 18 is also coupled to a drain 28 of a pair of cross coupled NMOS transistors 30, 32. The drain 34 of transistor 32 is coupled to gate 31 of transistor 30 and the drain 28 of transistor 30 is coupled to the gate 33 of transistor 32. The sources 36, 38 are coupled together and coupled to the bulk of NMOS transistor 26. The clock input 20 is coupled to the gate 40 of transistor 26 and to the drain 42 and source 44 of capacitor coupled transistor 48. The gate 50 of capacitor coupled transistor 48 is coupled to the source 52 of transistor 40 and to the drain 34 of transistor 32. The clock bar 22 signal is coupled to the source 54 of PMOS transistor 56. The gate 58 of PMOS transistor 56 is coupled to the gate 50 of capacitor coupled transistor 48 and to the gate 60 of NMOS transistor 62. The drain 64 of PMOS transistor 56 is coupled to the drain 66 of NMOS transistor 62. The bulk of PMOS transistor 56 is coupled to the power supply voltage Vpwr. The bulk of NMOS transistor 62 is coupled to the drain 68 of cross coupled transistor 70. A NMOS transistor 72 has its drain 74 coupled to the source 52 of NMOS 26 and the drain 76 of cross coupled transistor 78. The bulk of NMOS transistor 72 is coupled to the sources 80, 82 of cross coupled transistors 70, 78. The source 84 of the NMOS transistor 72 is coupled to the drain 68 of cross coupled transistor 70. The gate 71 of transistor 72 is coupled of the drain 66 of transistor 62.

The common stage 14 has a PMOS transistor 90 with a source 92 coupled to the source 52 of NMOS transistor 26 in the pre-stage 12. A gate 94 of PMOS transistor 90 is coupled to the source 96 of NMOS transistor 62 of the pre-stage 12 and the gate 98 of capacitor coupled transistor 100. The source 102 and drain 104 of capacitor coupled transistor 100 are coupled to the clock bar input 22. The drain 106 of transistor 90 is coupled to the drain 108 of NMOS transistor 110 and the gate 112 of NMOS transistor 114. The gate 116 of NMOS transistor 110 is coupled to the gate 94 of PMOS transistor 90. The drain 118 of NMOS transistor 114 is coupled to the source 84 of NMOS transistor 72 of the pre-stage 12 and to the drain 120 of cross coupled transistor 122. The source 124 of NMOS transistor 114 is coupled to the drain 126 of cross coupled transistor 128. The sources 130, 132 of the cross coupled transistors 122, 128 are coupled to the bulk of NMOS transistor 114.

The post stage 16 has a PMOS transistor 140 with its source 142 coupled to the gate 98 of capacitor coupled transistor 100 in the common stage. The gate 144 of PMOS transistor 140 is coupled to the gate 146 of capacitor coupled transistor 148. The source 150 and drain 152 of capacitor coupled transistor 148 are coupled to the clock input 20. The gate 144 of PMOS transistor 140 is coupled to the source 117 of transistor 110 and to the gate 154 of NMOS transistor 156. The drain 158 of PMOS transistor 140 is coupled to the drain 160 of NMOS transistor 156. The bulk of PMOS transistor 140 is coupled to the drains 162, 164 of cross coupled PMOS transistor 166, 168. The source 170 of cross coupled transistor 166 is coupled to the source 142 of PMOS transistor 140. The source 172 of cross coupled transistor 168 is coupled to ground. A gate 174 of NMOS transistor 176 is coupled to the drain 160 of NMOS transistor 156. The drain 179 of NMOS transistor 176 is coupled to the drain 178 of cross coupled transistor 180. The source 182 of NMOS transistor 182 is coupled to the source 184 of cross coupled transistor 186. The drains 188, 190 of cross coupled transistors 180, 186 are coupled to the bulk of NMOS transistor 176. The source 192 of NMOS transistor 156 is coupled to the output and to the drain 194 of cross coupled latch 196. The drain 160 of NMOS transistor 156 is coupled to the drain 198 of cross coupled transistor 200. The drains 202, 204 are coupled to the bulk of NMOS transistor 156.

In operation, the first stage input 18 for the Negative Charge pump 10 is at ground. The sequence starts with CLK 20 transitioning from a high to low logic level and CLKB 22 from low to high. As the CLK 20 transitions low, negative charge is coupled into the first boost stage which turns on the PMOS device 56 allowing CLKB 22 to transition to the gate of an NMOS device 72 which is the charge injection device (CID). This saturates the CID 72 and allows the boosted negative voltage to transition to the output of the first stage 12. This also keeps the NMOS device 62 controlling the gate of the CID 72 in cutoff. At the same time, as CLKB 22 transitions from low to high, positive charge is coupled into the second boost stage 14 which charge shares with the boosted first stage output and turns off the PMOS device 90. Furthermore, the third stage 16 which is controlled by CLK 20, couples negative charge into the third boost stage, which will saturate the second stage charge trapping NMOS device 100 and insure that the second stage NMOS CID 114 is in cutoff. This essentially traps the coupled negative charge on the output of the second stage 14. At this point, the third stage PMOS 140 supplies the NMOS CID 176 so that it turns on and supplies the output of the third stage 16 with a boosted negative voltage as well as keeping the third stage charge trapping NMOS device 156 in cutoff.

During the next transition, CLK 20 goes from low to high and CLKB 22 goes from high to low. This will essentially reverse the modes of operation from charge injection to charge trapping for stages one 12 and three 16 and from charge trapping to charge injection for the second stage 14. Therefore, for each CLK 20 transition, charge is pumped and trapped which essentially drives the output with a large negative voltage. The more stages used, the higher the pumped negative voltage is realized.

Another very important addition is the numerous comparison stages 220, 222, 224, 226, 228, 230 inserted in the Negative Charge pump. These comparison stages 220, 222, 224, 226, 228, 230 are used to supply the bulks of the devices with the minimum bulk to source (Vbs) or bulk to drain (Vbd) voltages (ideally zero). This keeps the threshold voltage of these CID's 72, 114, 176 as low as possible. This becomes extremely important because as the number of stages increases, the source and drain voltages decrease meaning the Pwell (bulk) of the NMOS CID 72, 114, 176 must decrease with the same amount. The post-stage 16 of the negative charge pump 10 also includes a comparison stage 226 for the PMOS control device 140. As the number of stages increase, the boosting stages become more negative and with the PMOS bulk tied to the internal supply (VPWR), reach a point where the devices come out of saturation and float the gate 174 of the NMOS CID 176 during the charge injection phase. Therefore, a comparison stage 226 is inserted between the source 142 and ground 172. The ideal situation is to compare both the source and drain as was done for the NMOS devices, however, since the substrate is tied to ground, the lowest that the bulk (Nwell) of the PMOS device 140 can go is ground in order to avoid forward biasing the Nwell to subtrate.

Figure 2:
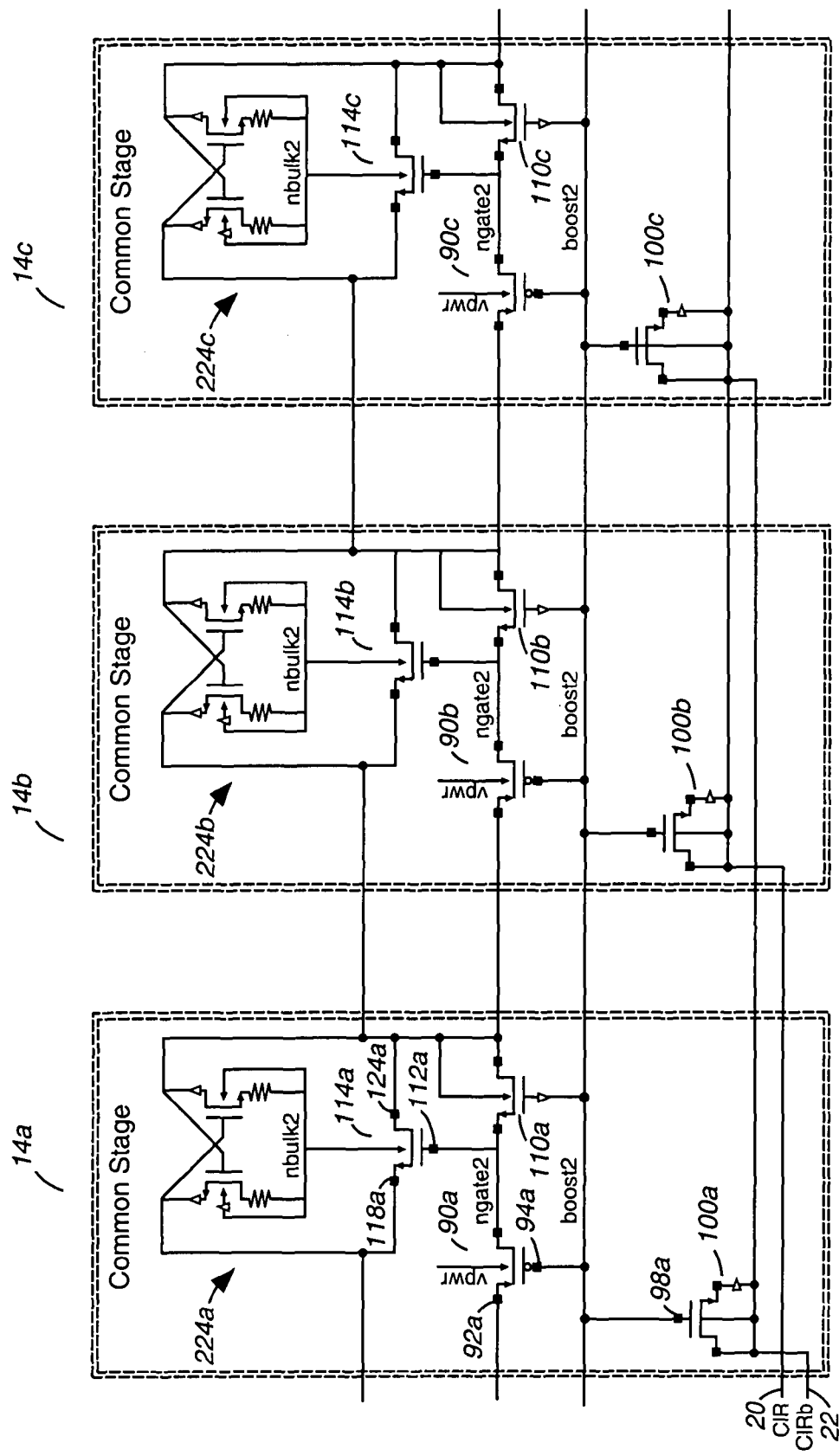
FIG. 2 is a circuit diagram of how multiple common stages are coupled together in accordance with one embodiment of the invention.

FIG. 2 is a circuit diagram of how multiple common stages are coupled together in accordance with one embodiment of the invention. In the diagram there is shown three common stages 14*a*, 14*b*, 14*c*. These stages 14*a*, 14*b*, 14*c* would be sandwiched between a pre-stage 12 and post stage 16. The devices are given the same reference numerals as shown in FIG. 1 with the exception that a letter has been placed after the numeral. Note that common stage 14*a* is connected exactly as shown in FIG. 1. Common stage 14*b* has the clock 20 input coupled to the source and drain of the capacitor coupled transistor 100*b* instead of the clock bar signal 22. Common stage 14*c* has the clock bar signal 22 coupled to the source and drain of the capacitor coupled transistor 100*c*. The connection between the third common stage 14*c* and the post stage 16 would be the same as shown in FIG. 1.

Thus there has been described a charge pump circuit that has a more efficient charge transfer.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A charge pump circuit, comprising:
   a pre-stage having an input transistor and a first charge injection device, wherein the pre-stage comprises a first comparison stage configured to control a voltage of the input transistor and a second comparison stage configured to control a voltage of the first charge injection device;
   a common stage with a second charge injection device controlled by a PMOS transistor, the common stage configured to receive a charge from the pre-stage; and
   a post stage configured to receive a charge from the common stage, wherein the post stage comprises:
      a third charge injection device including a NMOS transistor, and
      a third comparison stage configured to control a voltage of the third charge injection device based on a comparison of a plurality of voltages.

2. The circuit of claim 1, wherein the comparison stage is coupled to a bulk of the NMOS transistor.

3. The circuit of claim 2, wherein the pre-stage has a capacitor connected to a drain of the first charge injection device.

4. The circuit of claim 3, wherein the first charge injection device is controlled by a PMOS transistor.

5. The circuit of claim 4, wherein the first charge injection device is controlled by a NMOS transistor.

6. The circuit of claim 1, further including a comparison stage configured to control a voltage of a bulk of the second charge injection device.

7. A charge pump circuit, comprising:
a pre-stage comprising
  an input transistor,
  a first charge injection device,
  a first comparison stage configured to control a voltage of a bulk of the input transistor, and
  a second comparison stage configured to control a voltage of a bulk of the first charge injection device based on a comparison of a plurality of voltages;
a common stage with a second charge injection device controlled by a PMOS transistor, the common stage configured to receive a charge from the pre-stage; and
a post stage having a third charge injection device, the post stage configured to receive a charge from the common stage.

8. The circuit of claim 7, further including a PMOS transistor configured to control the third charge injection device.

9. The circuit of claim 7, further including a NMOS transistor configured to control the third charge injection device.

10. The circuit of claim 8, further including a comparison stage configured to control a voltage of a bulk of the PMOS transistor.

11. The circuit of claim 9, further including a comparison stage configured to control a voltage of a bulk of the NMOS transistor.

12. A charge pump circuit, comprising:
a pre-stage having an input transistor, a first charge injection device;
a plurality of common stages each having a second charge injection device controlled by a PMOS transistor, and
a post stage having a third charge injection device, wherein a first comparison stage controls a voltage of a bulk of the input transistor, and wherein a second comparison stage controls a voltage of a bulk of at least one of the first charge injection device, the second charge injection device, and the third charge injection device based on a comparison of a plurality of voltages.

13. The circuit of claim 12, further including a PMOS transistor configured to control the first charge injection device.

14. The circuit of claim 12, further including a NMOS transistor configured to control the first charge injection device.

15. The circuit of claim 13, wherein the comparison stage is configured to control a voltage of a bulk of the first charge injection device.

16. The circuit of claim 12, wherein the comparison stage is configured to control a voltage of a bulk of the third charge injection device.

17. The circuit of claim 16, wherein the PMOS transistor is further configured to control the third charge injection device.

* * * * *